US007533336B2

(12) United States Patent
Jaffe et al.

(10) Patent No.: US 7,533,336 B2
(45) Date of Patent: May 12, 2009

(54) METHOD AND APPARATUS FOR FACILITATING CONSTRUCTION OF E-COMMERCE WEB PAGES HAVING FEATURED PRODUCTS AND THE LIKE

(75) Inventors: Stephen E. Jaffe, Alpharetta, GA (US); Ralf Bull, Lawrenceville, GA (US); Matthew B. Trevathan, Kennesaw, GA (US); Ravesh Lala, Roswell, GA (US); Dennis F. Haynes, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 09/796,784

(22) Filed: Mar. 1, 2001

(65) Prior Publication Data

US 2002/0165799 A1 Nov. 7, 2002

(51) Int. Cl.
*G06F 17/00* (2006.01)
(52) U.S. Cl. .......................... 715/243; 715/234; 705/27
(58) Field of Classification Search ................. 715/517, 715/530, 243, 234; 705/27
See application file for complete search history.

(56) References Cited

U.S. PATENT DOCUMENTS

| 5,890,175 | A | * | 3/1999 | Wong et al. | 715/236 |
|---|---|---|---|---|---|
| 5,892,905 | A | * | 4/1999 | Brandt et al. | 713/201 |
| 5,930,777 | A | * | 7/1999 | Barber | 705/40 |
| 5,970,475 | A | | 10/1999 | Barnes et al. | 705/27 |
| 6,038,548 | A | | 3/2000 | Kamil | 705/35 |
| 6,185,587 | B1 | * | 2/2001 | Bernardo et al. | 715/513 |
| 6,298,331 | B1 | * | 10/2001 | Walker et al. | 705/15 |
| 6,304,886 | B1 | * | 10/2001 | Bernardo et al. | 715/530 |

(Continued)

FOREIGN PATENT DOCUMENTS

| AU | 200141922 A | * | 9/2001 |
|---|---|---|---|
| AU | 200163067 A | * | 11/2001 |
| EP | 1024448 A2 | * | 8/2000 |
| EP | 1218843 A2 | * | 7/2002 |
| GB | 2277662 A | * | 11/1994 |

OTHER PUBLICATIONS

Paduan, Jennifer, "Importing Spreadsheet Data into MBARI_Samples Database", 1998 [retrieved on Aug. 28, 2003], Retrieved from the Internet <URL http://www.mbari.org/samples/docs/import.html>.*

(Continued)

*Primary Examiner*—Rachna S Desai
(74) *Attorney, Agent, or Firm*—Saul Ewing LLP; John R. Pivnichny

(57) ABSTRACT

A method and apparatus for facilitating the creation of e-commerce Web pages that include Featured Product areas. The invention includes a spreadsheet or similar user-friendly data entry mechanism which can be used to enter content pertaining to featured products. The content is imported from the spreadsheet into a Featured Product information database. The invention further provides one or more display templates, each defining a look and feel for a Featured Product area of a Web page. Each template has a corresponding HTML file defining the template, within which the actual content is represented by variables. Display engine software retrieves Featured product information from the Featured Product database as well as retrieves a selected template HTML file and replaces the variables with the selected feature product information from the database to create a Featured Product area of a Web page.

9 Claims, 5 Drawing Sheets

U.S. PATENT DOCUMENTS

| | | | |
|---|---|---|---|
| 6,411,960 B1* | 6/2002 | Fisher | 707/102 |
| 6,647,305 B1* | 11/2003 | Bigelow | 700/97 |
| 6,839,683 B1* | 1/2005 | Walker et al. | 705/14 |
| 6,928,474 B2* | 8/2005 | Venkatesan | 709/224 |
| 6,957,383 B1* | 10/2005 | Smith | 715/207 |
| 7,076,453 B2* | 7/2006 | Jammes et al. | 705/26 |
| 7,197,479 B1* | 3/2007 | Franciscus de Heer et al. | 705/27 |
| 2001/0037331 A1* | 11/2001 | Lloyd | 707/4 |
| 2002/0046363 A1* | 4/2002 | Nelson et al. | 714/31 |
| 2002/0072989 A1* | 6/2002 | Van De Sluis | 705/26 |
| 2002/0077921 A1* | 6/2002 | Morrison et al. | 705/26 |
| 2002/0120621 A1* | 8/2002 | Fisher | 707/3 |
| 2002/0124075 A1* | 9/2002 | Venkatesan | 709/224 |
| 2002/0156757 A1* | 10/2002 | Brown | 707/1 |
| 2003/0084404 A1* | 5/2003 | Dweck et al. | 715/513 |
| 2003/0167213 A1* | 9/2003 | Jammes et al. | 705/27 |
| 2005/0177785 A1* | 8/2005 | Shrader et al. | 715/513 |

OTHER PUBLICATIONS

J. Paduan (Reference U), "Importing Spreadsheet Data into MBARI Samples Database", 1998 (retrieved on Aug. 28, 2003), Retrieved from the Internet <URL http://www.mbari.org/samples/docs/import.html>.*

Wolf, J.L. et al., "Scheduling Algorithms for the broadcast delivery of digital products", IEEE Transactions on Knowledge and Data Engineering, vol. 13, No. 5, pp. 721-741, Sep.-Oct. 2001.*

Seachrist, D. "Hanging out an Internet Shingle", BYTE vol. 22, No. 4, p. 136-40, Apr. 1997.*

Wang, J., "Develop an E-commerce Site Using WebClasses: VB6 WebClasses, together with SQL Server 7, Provide Everything You Need to Build an E-commerce Site Quickly," *Visual Basic Programmer's J.*, vol. 9, Issue 10, pp. 28-40 (Sep. 1999).

* cited by examiner

FIG. 2

| Category Number | Category Name | Outlet Category null=retail 'Y'=outlet | Template Number | Template Area Number | Feature Parent Product Number (SKU) | General Text | General Image File Name | URL for Link | Sale Price Minimum | Sale Price Maximum |
|---|---|---|---|---|---|---|---|---|---|---|
| 1 | NEW@OUTLE | y | 2 | 302 | 00028 | Toenail Soft | File path 1 | http://URL1 | 4.95 | 4.95 |
| 1 | NEW@OUTLE | y | 2 | 303 | 00090 | Magnetic Carpal Tunnel | File path 2 | http://URL1 | 6.95 | 6.95 |
| 1 | NEW@OUTLE | y | 2 | 306 | 06200 | 10-piece Haircutting Set | File path 3 | http://URL1 | 19.95 | 19.95 |
| 1 | NEW@OUTLE | y | 2 | 308 | 01932 | Epil Stop TM Kit and Roll | File path 4 | http://URL1 | 9.95 | 9.95 |
| 2 | NEW@BLAIR | | 3 | 310 | 01876 | Product Description 5 | File path 5 | http://URL2 | 23.95 | 23.95 |
| 2 | NEW@BLAIR | | 3 | 312 | 02493 | Product Description 6 | File path 6 | http://URL2 | 15.95 | 15.95 |
| 2 | NEW@BLAIR | | 4 | 314 | 08279 | Product Description 7 | File path 7 | http://URL3 | 12.95 | 12.95 |
| 2 | NEW@BLAIR | | 4 | 316 | 04134 | Product Description 8 | File path 8 | http://URL3 | 2.95 | 2.95 |
| 87462 | Musical | y | 2 | 312 | 07174 | Product Description 9 | File path 9 | http://URL4 | 8.95 | 8.95 |
| 87462 | Musical | y | 2 | 304 | 07119 | Product Description 10 | File path 10 | http://URL4 | 19.95 | 19.95 |
| 87462 | Musical | y | 2 | 306 | 03196 | Product Description 11 | File path 11 | http://URL4 | 99.95 | 99.95 |
| 87462 | Musical | y | 2 | 308 | 03249 | Product Description 12 | File path 12 | http://URL4 | 79.95 | 79.95 |

Process Flow - Featured Product Generation

METHOD AND APPARATUS FOR FACILITATING CONSTRUCTION OF E-COMMERCE WEB PAGES HAVING FEATURED PRODUCTS AND THE LIKE

FIELD OF THE INVENTION

The invention pertains to the implementation of e-commerce Web sites. More particularly, the invention pertains to the construction of Web pages for Web sites designed to promote the sale of products or services over the World Wide Web.

BACKGROUND OF THE INVENTION

The pages of an electronic commerce Web site through which products and/or services are offered for sale typically comprise a plurality of separate Web pages. The pages are arranged in a hierarchical fashion to facilitate navigation by a consumer to a page containing information about the product or products of interest to that consumer. For instance, an e-commerce Web site for a department store, which typically offers thousands of different products for sale, may comprise hundreds of Web pages (commonly constructed on the fly), each containing one or more hyperlinks that enable a consumer to navigate from a broad focus to the narrow focus by use of the hyperlinks. For example, at the highest level, the Web site may have a single home page containing various graphics and general interest text information about the department store and a series of hyperlinks to pages with more specific information. For instance, the top level home page may contain hyperlinks labelled "About Us", "Employment Opportunities", "Products", "Contact Us", etc. Each of those hyperlinks will take the consumer to another page containing more specific information corresponding to the heading of the hyperlink.

Each of those secondary pages may contain a multiplicity of hyperlinks to further pages containing even more specific information within that category. For instance, the page corresponding to the "Products" hyperlink may contain a plurality of links to further pages containing and corresponding to specific types of products. For instance, the "Products" page may contain a horizontal navigation bar near the top or vertically along the left side of the page containing a plurality of hyperlinks entitled "Clothing", "Housewares", "Electronics", "Hardware", "Automotive", etc. The pages addressed by each of these hyperlinks comprises content (e.g., text, graphics, multimedia) pertinent to the particular category identified by the hyperlink (e.g., clothes for the "Clothing" hyperlink). The page corresponding to the "Clothing" hyperlink may contain another navigation bar that provides hyperlinks to further narrowed categories, such as "Women", "Men", "Children".

The pages may be linked in this hierarchical fashion so Web surfers can readily navigate to a page containing information about the particular product(s) of interest.

Of course, the Web site also is enabled to allow the consumer to actually purchase the product by, for instance, clicking on a BUY "button" which hyperlinks to an "Order Form" page on which the consumer can enter credit card and other information so that the Web site operator can create a purchase order and/or invoice and thereafter mail the selected product(s) to the purchaser.

In most cases, the actual collection of hyperlinks that enable the hierarchical navigation through the Web site consumes a very small portion of the page. As noted above, it is typically provided in a navigation bar that runs across the top of the page. Another common scheme is to provide a navigation bar in the same or a separate frame running vertically along the left edge of the page. Typically, it is not until the consumer has navigated to a page pertaining to a relatively specific topic, e.g., "Belts" in the hierarchy of "Home"→"Products"→"Clothing"→"Men"→"Dress Wear"→"Office Casual"→"Accessories"→"Belts", before any significant portion of the page is actually used for displaying information about the specific products to which the user has navigated.

Accordingly, the vast majority of the space on most of the Web pages of an e-commerce site can be used for advertising and other marketing purposes. Electronic commerce Web site professionals commonly call this large portion of the page that is used for advertising and the like the "Featured Product" area of the page and use that space to advertise products or services that are on sale or new products/services or new categories of products/services or anything else that might lead the consumer to make an additional purchase from that Web site. Thus, it should be understood that the term Featured product is not intended to be limited to products per se, but refers more broadly to any special information, such as new or sale products/services, employment opportunities, or any information that the Web site operator believes may be of interest to visitors to the Web site.

Typically, the Featured Product area of each page contains images and textual information about a small number of "special" products or offers that are related to the particular category of that page. Electronic commerce Web site operators tend to feature somewhere between two and six products in the Featured Product area, and most commonly three or four products. Further, it is common to have the information pertaining to one particular product consume a larger portion of the Featured Product area and smaller areas devoted to two or three other products.

It is desirable for the Featured Product area of different pages within a Web site to have a different "look and feel" in order to attract the consumer's eyes as he or she navigates through the Web site. Specifically, if all of the pages had a similar look and feel to the Featured Product area, the consumer, who is probably concentrating more on navigating to the particular product than looking at the Featured Product areas, may have the impression that the Featured Product areas of all the pages contain the same information and thus be even less likely to look at the featured products.

The Featured Product areas typically contain information about sale items or other special offers that, essentially by definition, are relatively short in duration (i.e., a sale typically may last a day or a week). Hence, the Featured Product areas of the Web pages typically are updated and revised on a regular basis, whereas the navigation bar portion and remainder of the pages remain unchanged over much longer periods.

Accordingly, it is an object of the present invention to provide a method and apparatus for facilitating the creation of Web pages and particularly the Featured Product area of electronic commerce Web pages.

SUMMARY OF THE INVENTION

The invention is a software-based method and apparatus for facilitating the creation of Web pages for electronic commerce Web sites and, particularly, the Featured Product areas of such Web pages. The invention can be considered to comprise three portions. The first portion is a Featured Product database within which the electronic commerce Web site operator can store content (i.e., information) about featured products/services, etc. Such content may comprise electronic photographs or other images, descriptive text, price information, etc., pertaining to the featured products. This first portion of the invention also comprises a user-friendly means requiring little or no computer programming aptitude to enter the featured product information into the database. In one preferred embodiment, the user may enter the information onto a spreadsheet in one or more of the commonly available commercial spreadsheet programs. The data in the spreadsheet is imported from the spreadsheet into the database.

The second portion of the invention comprises a collection of semi-custom and/or custom Featured Product templates. Each template essentially is a particular layout for the arrangement of information of one or more featured products on a page. For instance, in a simple form, a template may comprise three boxes on a page, including one large one in the center of the page and two smaller ones beneath the larger one, each box defining the portion of the page that will be dedicated for display of information about a particular featured product. In more complex embodiments, each of those boxes may be further segmented into smaller sections, such as a box corresponding to where an image of the product will be positioned and another box where descriptive text about the product may be positioned. The software of the invention enables the operator to view a graphical representation of each template. For each template, there is an HTML file containing the HTML code that defines the template. Within the HTML file, the content pertaining to the actual featured products that is to be filled in to create an actual Web page is represented by variables, each variable being a place holder for actual content corresponding to a category in the database for entry of data about the featured products, such as price, product short description, thumbnail image path and file name, full sized image path and file name, product long description, etc.

The third piece of the package is a display engine. The display engine software relates the content from the database categories for the featured products to the variables in the template and inserts the content into the selected HTML template files to generate the Featured Product areas of a Web pages.

BRIEF DESCRIPTION OF THE DRAWINGS

FIG. 2 is an illustration of a spreadsheet in accordance with the present invention in which a Web site operator has entered Featured product information.

DETAILED DESCRIPTION OF THE INVENTION

Figure 1:
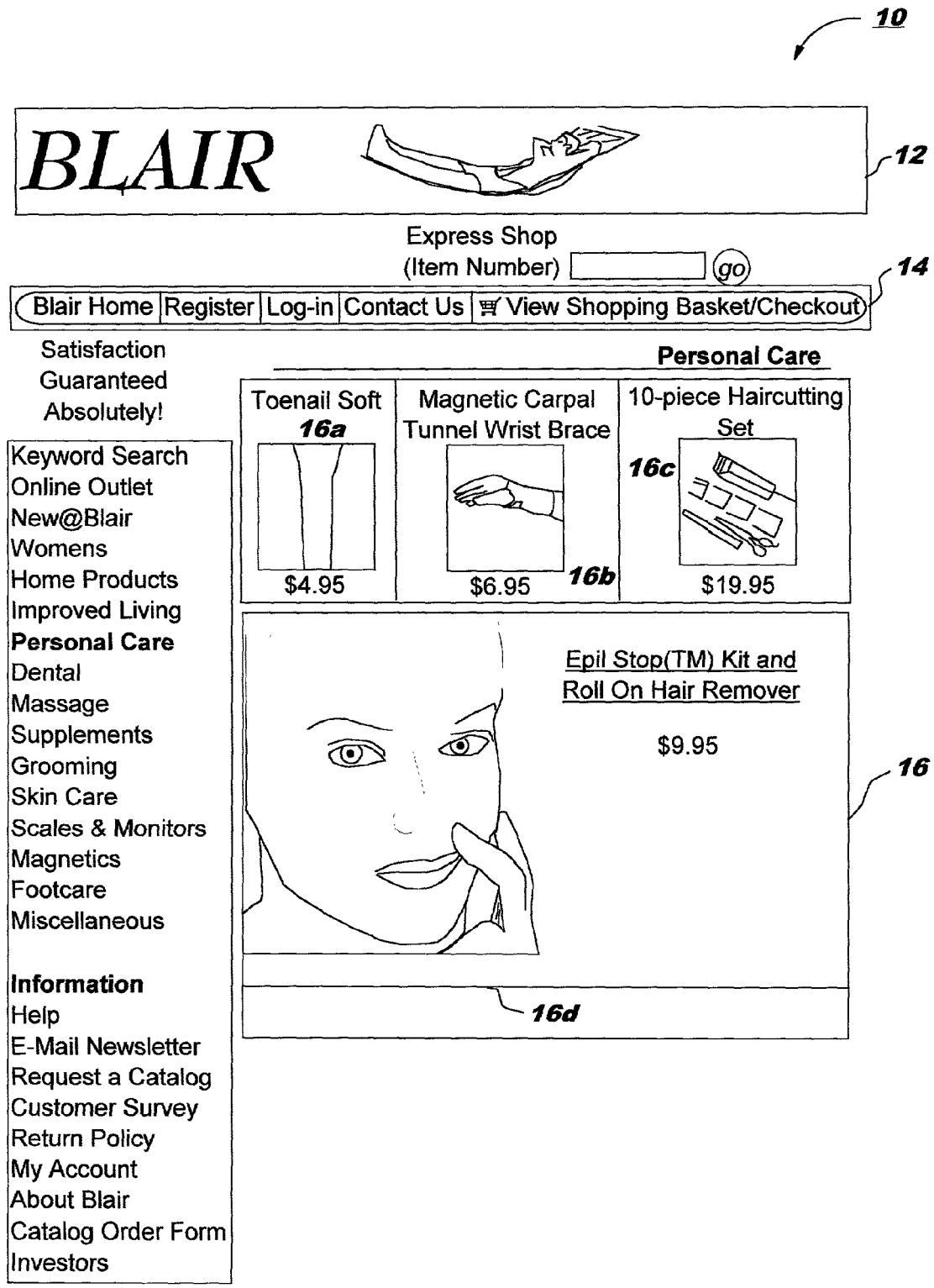
FIG. 1 is a screen capture of a Web page including a Featured Product area.

FIG. 1 is a screen capture of an exemplary Web page in an electronic commerce Web site including a header portion 12, a horizontal navigation bar 14, a separate, vertical, navigation bar 15, a Featured Product area 16, and a footer portion 18. The line boxes delimiting sections 12, 14, 15, 16, and 18 are for illustrative purposes to help delineate between the above-identified sections and do not actually appear on the screen. In this particular exemplary Web site, the horizontal navigation bar 14 is a general navigation bar containing hyperlinks to pages on the site corresponding to relatively general content, such as the home page, a page for registering with the retailer, contact information for the retailer and the shopping cart page. It appears in the same form at the top of most, if not all, of the pages of the Web site.

The vertical navigation bar 15 in FIG. 1 is the one that contains hyperlinks that enable the consumer to continually narrow his focus to a particular product or product group. The vertical navigation bar 15 contains a plurality of hyperlinks to specific categories of interest, as shown. When the user selects one of the hyperlinks, e.g. Personal Care, his/her browser, of course, hyperlinks to the Personal Care page, which is the particular page shown in FIG. 1. In this exemplary Web site, the Personal Care page displays a vertical navigation bar 15 that contains the same general hyperlinks as the previous, more general, page (not shown). However, under the selected hyperlink, a group of additional hyperlinks corresponding to sub-categories of the particular category of the selected hyperlink appear.

This inter-page navigation bar scheme is merely exemplary. In other Web site designs, the navigation bar 15 in the Personal Care Web page might be entirely different from the navigation bar of the previous, more general, page. For instance, it might contain only the hyperlinks corresponding to the subcategories of Personal Care, namely, Dental, Massage, Supplements, Grooming, Skin Care, Scales & Monitors, Magnetics, Footcare, and Miscellaneous.

If the user should, for example, select the "Dental" hyperlink in FIG. 1, he or she would be brought to the Dental page in which the vertical navigation bar would be similar to that shown in FIG. 1, except that, under the Dental hyperlink, an additional list of hyperlinks to sub-sub-categories would appear, such as Toothbrushes, Dental Floss, Mouthwash, Miscellaneous.

The Featured Product area 16 of the Personal Care page 10 includes information pertaining to four featured products. In this example, the first featured product is a foot medication and the content associated with that product is shown in product area 16a. The second featured product is a wrist brace and the content associated with that product is shown in product area 16b. The third featured product is a hair-cutting kit and the content associated with that product is shown in product area 16c. Finally, the fourth featured product is a hair remover and is shown in product area 16d. Each product area 16a, 16b, 16c and 16d comprises an image, descriptive text, and a price portion that shows the sale price.

As should be apparent from the example of FIG. 1, the retailer operating the Web site containing this page is unlikely to have the need to modify the header portion 12, footer portion 18 or navigation bar portions 14 and 15 very often. However, the Featured Product area 16 is likely to be updated very frequently.

Accordingly, it is desirable to provide a method and apparatus that allows e-commerce retailers to quickly and easily modify the Featured Product areas of the Web pages in its Web site. It would be particularly desirable to allow the electronic commerce retailer to enter the content corresponding to featured products that it wishes to have displayed in the Featured Product areas of its various Web pages and the particular way in which it wants the Featured product content information to be displayed without the need to write or modify HTML code.

The present invention provides a method and apparatus that allows the electronic commerce retailer to enter Featured product content information into a Featured Product database without the need for any specialized computer programming or HTML knowledge. In one particular embodiment, the user may enter information in a spreadsheet computer program. The data is then imported into the database from the spreadsheet program. The invention further provides the retailer with a plurality of display templates defining how the Featured product information will be displayed. The retailer selects a template to be used with each featured product. The invention further comprises display engine software that can retrieve selected content data from the Featured Product database, insert it into a template selected by the user, and create the HTML page automatically without the need for the user to modify any HTML code.

The invention can be considered to comprise three portions, namely, 1) the template database; 2) a Featured Product database, including software by which the user can enter Featured product information for insertion into the Featured Product database; and 3) software for combining the selected template and the selected featured product(s) information to create a Web page.

FIG. 2 is an illustration of a portion of a spreadsheet 200 in accordance with the present invention in which the user has entered featured product information about a plurality of featured products, including the products displayed in the Featured Product area of FIG. 1. In most practical embodiments of the invention, there may be many more featured products in the database and many more categories/columns for information about each featured product. In this example, each row of the spreadsheet corresponds to a particular featured product and each column pertains to a particular type of information about the featured product. The user enters various information about each featured product in the designated columns. For instance, in this example, for each featured product, the user can enter product category name and number, product SKU number, the path to an image file (that image file presumably containing a picture of the product or some other relevant image), sale price, and a text field in which the user may enter the text he would like to appear on the Web page regarding that product. The aforementioned columns/categories are merely exemplary.

In the particular embodiment illustrated in FIG. 2, the spreadsheet and Featured Product database also include columns/categories for indicating the particular Featured Product template and product area within that template that is to be used in connection with that featured product as well as the URL of the actual Web page that the featured product will be displayed within. The template number category/column identifies the particular template in the template database which will be used in connection with the featured product and the template area number indicates the particular product area of that template within which that product will appear.

However, in alternate embodiments, the database does not need to include such information. Instead, through options provided to the user by the display engine software at a later time, the user may correlate the featured products with templates and specific product areas of the templates and also correlate the populated templates with specific Web pages.

The Featured product information entered by the user into the spreadsheet can be imported into a Featured Product database in any well known manner.

In accordance with the invention, the electronic retailer also is provided with a database of templates defining various presentation schemes for the Featured Product areas of Web pages. Preferably, the templates are semi-custom templates, meaning that they have been designed specifically for the retailer. In a preferred embodiment of the invention, the retailer also may be provided with software which allows the retailer to easily design additional, fully custom templates and add them to the database of templates. The templates essentially are HTML code defining the presentation characteristics of pages, but without the actual information content.

In the templates, the "content" is represented by variables that are place holders for and will be replaced by the real content pertaining to the featured products obtained from the Featured Product database as described in more detail below. Each variable in the template corresponds to a column of the spreadsheet which, in turn, corresponds to a category of the database. Accordingly, once the particular featured product is identified, the display engine can retrieve all of the information pertaining to that featured product from the database and insert it into the template in place of the corresponding variable.

In at least one preferred embodiment of the invention, the variables may comprise generic content that generally corresponds to the category from the Featured Product database to which it corresponds. For instance, the variable for the image path may comprise a path to an actual image. In this manner, when a user calls up a template, he can view the template using standard HTML interpreting software (e.g., the HTML intepreter of Netscape Navigator or Microsoft Internet Explorer) in order to view a reasonable facsimile of what the actual page will look like when populated with real content.

In a preferred embodiment of the invention, the display engine software includes HTML interpreting software and some form of menu driven Graphical User Interface (GUI) that allows the user to easily thumb through the templates to view them.

Figure 3:
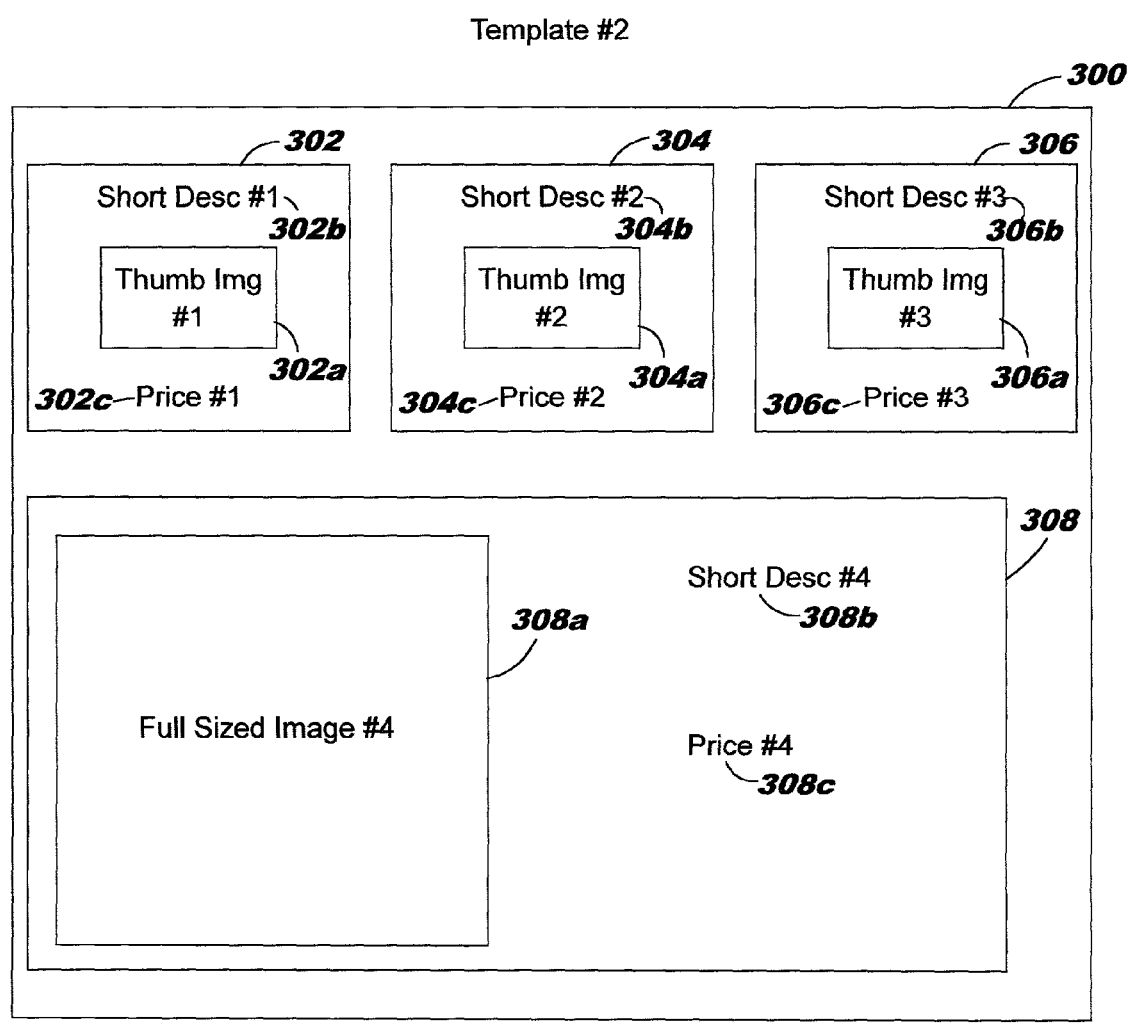
FIG. 3 is a graphic image of a template in accordance with the present invention.

FIG. 3 is a screen capture of an exemplary display template 300 as rendered by HTML interpreting software and, in fact, is the template corresponding to the Featured Product template used in the Web page shown in FIG. 1. Each Featured Product display template provides a different option for the layout of the Featured Product area of a Web page. For instance, FIG. 3 illustrates a Featured Product template comprising four product areas, 302, 304, 306 and 308, for providing information (herein alternately termed "content") for first, second, third and fourth featured products, respectively. In this particular template, the first, second and third product areas 302, 304 and 306 are small display areas arranged in a row across the page, all of equal height and width. The fourth product area 308 is a larger area that runs entirely across the page and has about twice the height of the other areas, as illustrated. Each of those areas may be further broken down into sub-areas representing the portion of the display that will be used to display different items from the spreadsheet/database, such as image, price, and textual description. FIG. 3, for example, shows product areas 302a, 304a, 306a and 308a corresponding to the areas for the images. Other sub-areas also may be illustrated with boxes or generic content.

Table I printed at the end of this specification shows the actual HTML code for the template of FIG. 3. The variables for this particular template that correspond to the portion of the spreadsheet shown in FIG. 2 are printed in boldface for ease of reference and are as follows:

a302_sdesc: This corresponds to the textual description of the product to be displayed in product area 302 in FIG. 3 and the General Text column of the spreadsheet of FIG. 2.

a302_price_curr_min. This corresponds to the minimum sale price of the featured product to be displayed in product area 302 in FIG. 3 and the Sale Price Minimum column of the spreadsheet of FIG. 2.

a302_price_curr_max. This corresponds to the maximum sale price of the featured product to be displayed in product area 302 in FIG. 3 and the Sale Price Maximum column of the spreadsheet of FIG. 2.

a302_tnimage. This defines the area for the image that is to be inserted into box 302*a* in FIG. 3. The image addressed in the General Image File Name column of the spreadsheet will be inserted in that box.

a304_sdesc. This corresponds to the textual description of the product to be displayed in product area 304 in FIG. 3 and the General Text column of the spreadsheet of FIG. 2.

a304_price_curr_min. This corresponds to the minimum sale price of the Featured product to be displayed in area 304 of FIG. 3 and the Sale Price Minimum column of the spreadsheet of FIG. 2.

a304_price_curr_max. This corresponds to the maximum sale price of the featured product to be displayed in area 304 of FIG. 3 and the Sale Price Maximum column of the spreadsheet of FIG. 2.

a304_tnimage. This defines the area for the image that is to be inserted into box 304*a* in FIG. 3. The image addressed in the General Image File Name column of the spreadsheet will be inserted in that box.

a306_sdesc. This corresponds to the textual description of the product to be displayed in product area 306 in FIG. 3 and the General Text column of the spreadsheet of FIG. 2.

a306_price_curr_min. This corresponds to the minimum sale price of the Featured product to be displayed in area 306 of FIG. 3 and the Sale Price Minimum column of the spreadsheet of FIG. 2.

a306_price_curr_max. This corresponds to the maximum sale price of the featured product to be displayed in area 306 in FIG. 3 and the Sale Price Maximum column of the spreadsheet.

a306_tnimage. This defines the area for the image that is to be inserted into box 306*a* in FIG. 3. The image addressed in the General Image File Name column of the spreadsheet will be inserted in that box.

a308_sdesc. This corresponds to the textual description of the product to be displayed in product area 308 in FIG. 3 and the General Text column of the spreadsheet of FIG. 2.

a308_price_curr_min. This corresponds to the minimum sale price of the Featured product to be displayed in area 308 in FIG. 3 and the Sale Price Minimum column of the spreadsheet of FIG. 2.

a308_price_curr_max. This corresponds to the maximum sale price of the featured products to be displayed in area 308 in FIG. 3 and Sale Price Maximum column of the spreadsheet of FIG. 2.

a308_fimage. This defines the area for the image that is to be inserted into box 308*a* in FIG. 3. The image addressed in the General Image File Name column of the spreadsheet will be inserted in that box.

The database/spreadsheet provides minimum and maximum sale price options because a single "featured product" may actually comprise a series of related products with different prices. Accordingly, although not illustrated in FIG. 1, in some instances, it may be necessary to show a price range rather than a single price. As can be seen in FIG. 2, when a featured product has only one sale price, the same price should be entered in both columns. The HTML code defining the template is written to display the sale price just once when both columns contain the same price for a given featured product.

Also, there are other variables in the template HTML code shown in Table I that do not correspond to categories/columns of the spreadsheet of FIG. 2. This is because there may be other databases from which data is drawn to populate the Web page. However, those other databases are not shown in the Figures or otherwise discussed in this specification in order not to obfuscate the description of the invention.

Even further, each template need not contain a variable for each category in the Featured Product database. Such templates simply would not use data entered in those columns, if any.

In accordance with a preferred embodiment of the invention, the user enters the featured product content into the spreadsheet using a standard spreadsheet software program such as Microsoft Excel, Corel Quattro or Lotus 1-2-3. The display engine can then import the data from the spreadsheet file into the Featured Product database, As previously described, in the particular embodiment of the invention illustrated in the figures of this specification, the Featured Product database includes, not only the content pertaining to the product, but also the URL of the page within which it is to be inserted, the Featured Product template to be used, and the particular product area of the template within which it is to appear. Accordingly, when invoked, the display engine substitutes the proper product content for the various variables in the selected template and product area of that template and inserts the populated template into the indicated page to generate a complete Web page for display to the consumer.

Figure 4:
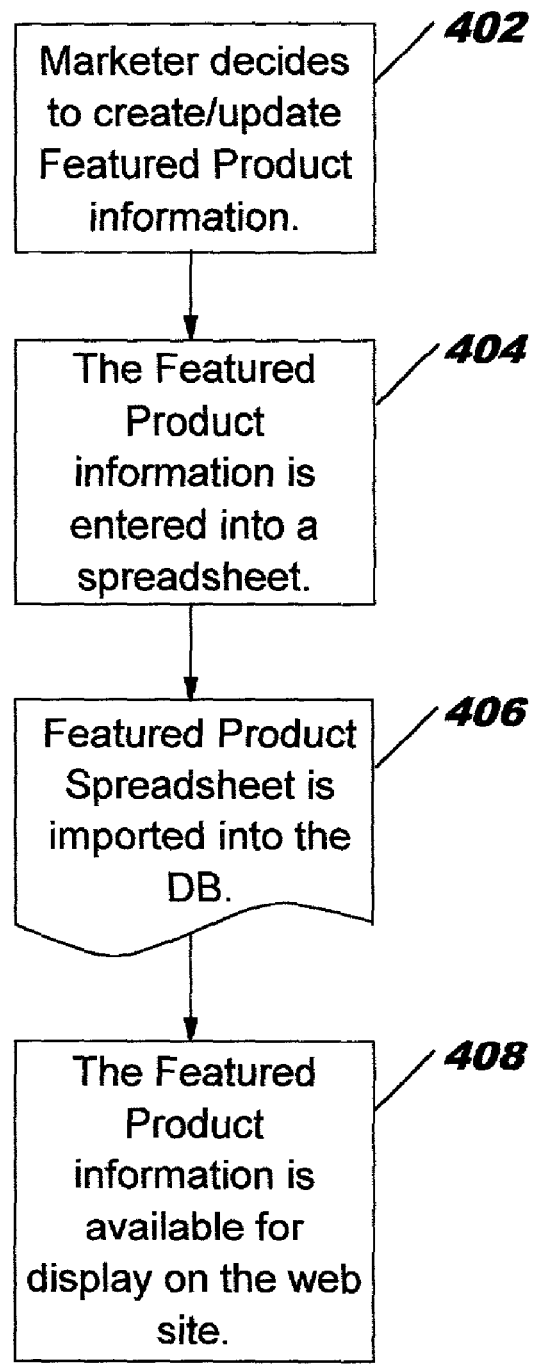
FIG. 4 is a flow chart illustrating entry of information about a featured product into a Featured Product database in accordance with the present invention.
Figure 5:
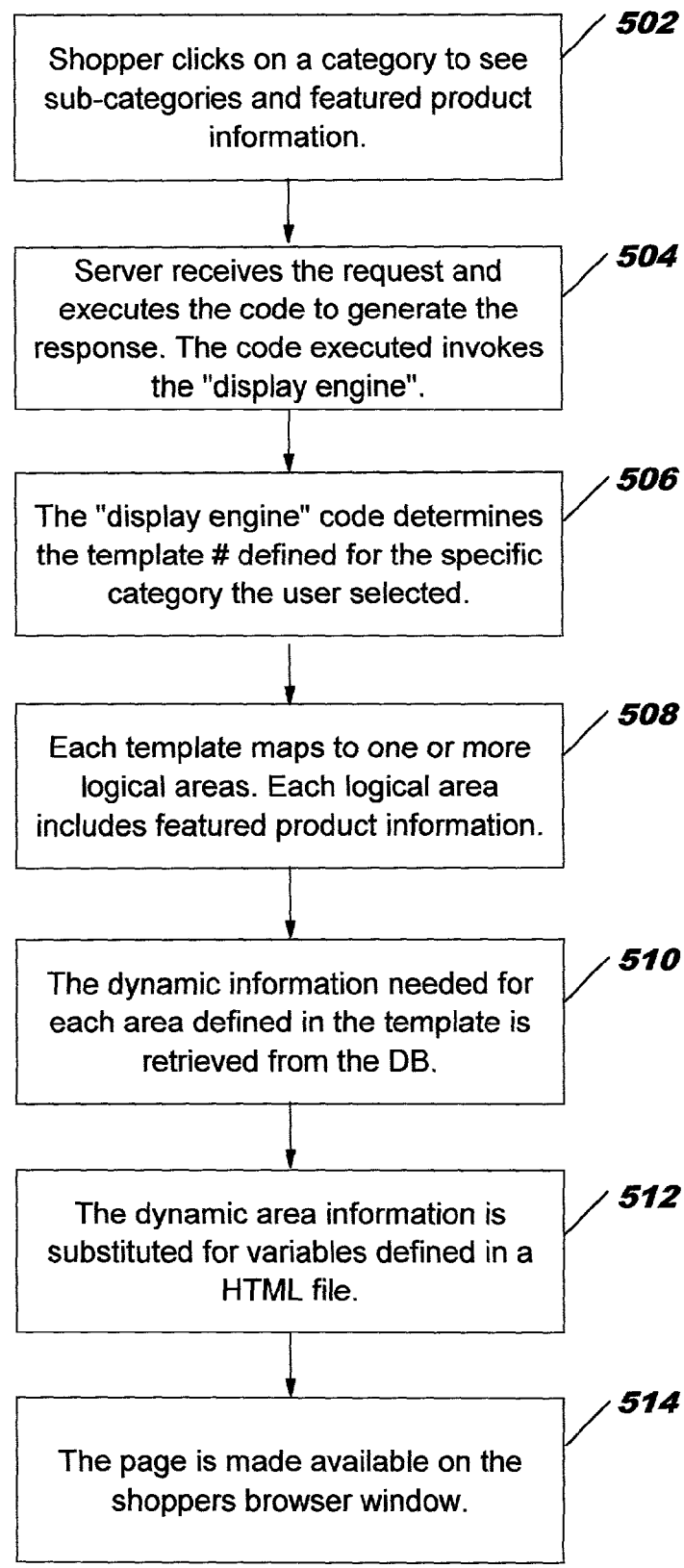
FIG. 5 is a flow chart illustrating on the fly generation of a Web page for display to a customer in accordance with the present invention.

As is well known in the art of electronic commerce Web site development, some Web sites are constructed such that pages that are called for by users browsing the site are constructed on the fly as the user accesses them, rather than being stored as complete pages on a server (as is the more traditional approach). FIGS. 4 and 5 are flow charts illustrating a process flow for featured product data generation and featured product presentation, respectively, in accordance with such an embodiment with on-the-fly page construction.

Referring first to featured product data generation as illustrated in FIG. 4, in step 402, the marketer decides to create or update the information in the Featured Product database. In step 404, the marketer does so by entering data into a spreadsheet program such as Lotus 1-2-3. In step 406, the information in the Featured Product spreadsheet is imported into the Featured Product database. Finally, in step 408, the featured product information is now available for use by the display engine to generate Web pages for display on the Web site including the new Featured product information.

FIG. 5 illustrates a featured product presentation process flow for the type of Web site mentioned above in which pages for display are generated on the fly. Particularly, in step 502, the consumer selects a hyperlink that should take him or her to a sub-category page having a Featured Product area. In step 504, the e-commerce retailer's server receives the request for the page, generates a response to the shopper's browser and invokes the display engine.

In step 506, the display engine consults the Featured Product database and determines the particular template to be used for the corresponding category. In step 508, the display engine determines the number of separate areas defined for individual featured products in that template.

In step 510, the display engine retrieves the featured product information from the database needed to build the Web page. In step 512, the display engine substitutes the data from the database for the variables defined in the HTML template to create the page. Finally, in step 514, the page is sent to the shopper's browser.

In accordance with this invention, the user of the invention needs essentially no HTML or computer programming knowledge. The user simply must be able to enter data in a spreadsheet using a standard spreadsheet program. In an alternate embodiment which may be preferable for users having more substantial knowledge of Web page programming such as HTML, Java, JavaScript, etc., the user may be enabled to enter featured product information into the Featured Product database through a Java applet that front ends the database. Even further, users who have HTML programming knowledge can generate their own custom templates and add them to the template database.

The present invention is consistent with the model view controller programming paradigm in which the content of the page and the presentation of the page are programmed entirely separately from each other and a controller (the display engine) combines them to create a Web.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

TABLE I

```
<!-- content area begins -->
<td width=3D"457">
<table cellpadding=3D"0" cellspacing=3D"0" border=3D"0" width=3D"457">
<tr>
<td width=3D"36" height=3D"24" valign=3D"top"><img =
src=3D"$(http)/images/curve.gif" width=3D"36" height=3D"24" border=3D"0" =
alt=3D"curve"></td>
<td width=3D"421" height=3D"24"><br><p =
class=3D"catagoryHeader">$(cgsdesc)</p></td>
</tr>
<tr>
<td colspan=3D"2" align=3D"right"><img src=3D"$(http)/images/black.gif" =
width=3D"400" height3D"1" border=3D"0" alt=3D"line"></td>
</tr>
</table>
<table cellpadding=3D"0" cellspacing=3D"0" border=3D"0" width=3D"457">
<tr>
<td><p class=3D"tagLine">$(cgldesc)</p></td>
</tr>
</table>
<table cellpadding=3D"0" cellspacing=3D"0" border=3D"0" width=3D"457">
<tr>
<td width=3D"12"><spacer width=3D"12" height=3D"1"></td>
<td>
<table cellpadding=3D"0" cellspacing=3D"5" border=3D"0" width=3D"400">
<tr>
<td width=3D"100" valign=3D"top"><p class=3D"shortDescription"><a =
href=3D"$(http)/$(product_url)prmenbr=3D$(cgmenbr)&store_cd=3D$(store_cd)=
&cgrfnbr=3D$(a302_cgrfnbr)&prrfnbr=3D$(a302_prrfnbr)&pcats=3D$(a302_pcats)"
>=
$(a302_sdesc)</a></p></td>
<td width=3D"100" valign=3D"top"><p class=3D"shortDescription"><a =
href=3D"$(http)/$(product_url)prmenbr=3D$(cgmenbr)&store_cd=3D$(store_cd)=
&cgrfnbr=3D$(a304_cgrfnbr)&prrfnbr=3D$(a304_prrfnbr)&pcats=3D$(a304_pcats)"
>=
$(a304_sdesc)</a></p></td>
<td width=3D"100" valign=3D"top"><p class=3D"shortDescription"><a =
href=3D"$(http)/$(product_url)prmenbr=3D$(cgmenbr)&store_cd=3D$ (store_cd)=
&cgrfnbr=3D$(a306_cgrfnbr)&prrfnbr=3D$(a306_prrfnbr)&pcats=3D$(a306_pcats)"
>=
$(a306_sdesc)</a></p></td>
</tr>
<tr>
<td width=3D"100" valign=3D"top"><a =
href=3D"$(http)/$(product_url)prmenbr=3D$(cgmenbr)&store_cd=3D$(store_cd)=
&cgrfnbr=3D$(a302_cgrfnbr)&prrfnbr=3D$(a302_prrfnbr)&pcats=3D$(a302_pcats)"
>=
<img src=3D"$(http)/prodimg$(a302_tnimage)" width=3D"100" height=3D"100" =
border=3D"0" alt=3D"$(a302_sdesc)"></a></td>
<td width=3D"100" valign=3D"top"><a =
href=3D"$(http)/$(product_url)prmenbr=3D$(cgmenbr)&store_cd=3D$(store_cd)=
&cgrfnbr=3D$(a304_cgrfnbr)&prrfnbr=3D$(a304_prrfnbr)&pcats=3D$(a304_pcats)"
>=
<img src=3D"$(http)/prodimg$(a304_tnimage)" width=3D"100" height=3D"100" =
border=3D"0" alt=3D"$(a304_sdesc)"></a></td>
<td width=3D"100" valign=3D"top"><a =
href=3D"$(http)/$(product_url)prmenbr=3D$(cgmenbr)&store_cd=3D$(store_cd)=
&cgrfnbr=3D$(a306_cgrfnbr)&prrfnbr=3D$(a306_prrfnbr)&pcats=3D$(a306_pcats)"
>=
<img src=3D"$(http)/prodimg$(a306_tnimage)" width=3D"100" height=3D"100" =
border=3D"0" alt=3D"$(a306_sdesc)"></a></td>
</tr>
```

TABLE I-continued

```
<tr>
<td width=3D"100" align=3D"left" valign=3D"top">
<table cellpadding=3D"0" cellspacing=3D"0" border=3D"0">
<tr>
<td valign=3D"top">
<p class=3D"smallStrikePrice">
%IF (a302_price_orig_min !=3D " ")
    <b>$$(a302_price_orig_min)</b>
%ENDIF
%IF (a302_price_orig_max !=3D " " &&a302_price_orig_max !=3D =
a302_price_orig_min)
    / $$(a302_price_orig_max)
%ENDIF
</p>
</td>
</tr>
<tr>
<td valign=3D"top">
%IF (a302_price_orig_min !=3D " " || a302_price_orig_max !=3D " ")
    <p class=3D"smallSalePrice">
%ELSE
    <p class=3D"smallListPrice">
%ENDIF
%IF (a302_price_curr_min !=3D " ")
    <b>$$(a302_price_curr_min)</b>
%ENDIF
%IF (a302_price_curr_max !=3D " " &&a302_price_curr_max !=3D =
a302_price_curr_min)
    / $$(a302_price_curr_max)
%ENDIF
</p>
</td>
</tr>
</table>
</td>
<td width=3D"100" align=3D"left" valign=3D"top">
<table cellpadding=3D"0" cellspacing=3D"0" border=3D"0">
<tr>
<td valign=3D"top">
<p class=3D"smallStrikePrice">
%IF (a304_price_orig_min !=3D " ")
    <b>$$(a304_price_orig_min)</b>
%ENDIF
%IF (a304_price_orig_max !=3D " " &&a304_price_orig_max !=3D =
a304_price_orig_min)
    / $$(a304_price_orig_max)
%ENDIF
</p>
</td>
</tr>
<tr>
<td valign=3D"top">
%IF (a304_price_orig_min !=3D " " || a304_price_orig_max !=3D " ")
    <p class=3D"smallSalePrice">
%ELSE
    <p class=3D"smallListPrice">
%ENDIF
%IF (a304_price_curr_min !=3D " ")
    <b>$$(a304_price_curr_min)</b>
%ENDIF
%IF (a304_price_curr_max !=3D " " &&a304_price_curr_max !=3D =
a304_price_curr_min)
    / $$(a304_price_curr_max)
%ENDIF
</p>
</td>
</tr>
</table>
</td>
<td width=3D"100" align=3D"left" valign=3D"top">
<table cellpadding=3D"0" cellspacing=3D"0" border=3D"0">
<tr>
<td valign=3D"top">
<p class=3D"smallStrikePrice">
%IF (a306_price_orig_min !=3D " ")
    <b>$$(a306_price_orig_min)</b>
%ENDIF
```

TABLE I-continued

```
%IF (a306_price_orig_max !=3D " " &&a306_price_orig_max !=3D =
a306_price_orig_min)
    / $$(a306_price_orig_max)
%ENDIF
</p>
</td>
</tr>
<tr>
<td valign=3D"top">
%IF (a306_price_orig_min !=3D " " || a306_price_orig_max !=3D " ")
    <p class=3D"smallSalePrice">
%ELSE
    <p class=3D"smallListPrice">
%ENDIF
%IF (a306_price_curr_min !=3D " ")
    <b>$$(a306_price_curr_min)</b>
%ENDIF
%IF (a306_price_curr_max !=3D " " &&a306_price_curr_max !=3D =
a306_price_curr_min)
    / $$(a306_price_curr_max)
%ENDIF
</p>
</td>
</tr>
</table>
</td>
</tr>
</table>
<br>
<table cellpadding=3D"0" cellspacing=3D"0" border=3D"0" width=3D"400">
<tr valign=3D"top">
<td width=3D"241"><a =
href=3D"$(http)/$(product_url)prmenbr=3D$(cgmenbr)&store_cd=3D$(store_cd)=
&cgrfnbr=3D$(a308_cgrfnbr)&prrfnbr=3D$(a308_prrfnbr)&pcats=3D$(a308_pcats)"
>=
<img src=3D"$(http)/prodimg$(a308_fimage)" width=3D"241" height=3D"241" =
border=3D"0" alt=3D"$(a308_sdesc)"></a></td>
<td width=3D"12"><spacer type=3D"block" width=3D"12" height=3D"1"></td>
<td valign=3D"top">
<p class=3D"shortDescription"><a =
href=3D"$(http)/$(product_url)prmenbr=3D$(cgmenbr)&store_cd=3D$(store_cd)=
&cgrfnbr=3D$(a308_cgrfnbr)&prrfnbr=3D$(a308_prrfnbr)&pcats=3D$(a308_pcats)"
>=
$(a308_sdesc)</a></p>
<table cellpadding=3D"0" cellspacing=3D"0" border=3D"0">
<tr>
<td valign=3D"top">
<p class=3D"smallStrikePrice">
%IF (a308_price_orig_min !=3D " ")
    <b>$$(a308_price_orig_min)</b>
%ENDIF
%IF (a308_price_orig_max !=3D " " &&a308_price_orig_max !=3D =
a308_price_orig_min)
    / $$(a308_price_orig_max)
%ENDIF
</p>
</td>
</tr>
<tr>
<td valign=3D"top">
%IF (a308_price_orig_min !=3D " " || a308_price_orig_max !=3D " ")
    <p class=3D"smallSalePrice">
%ELSE
    <p class=3D"smallListPrice">
%ENDIF
%IF (a308_price_curr_min !=3D " ")
    <b>$$(a308_price_curr_min)</b>
%ENDIF
%IF (a308_price_curr_max !=3D " " &&a308_price_curr_max !=3D =
a308_price_curr_min)
    / $$(a308_price_curr_max)
    %ENDIF
    </p>
    </td>
    </tr>
    </table>
    <p class=3D"featureDescription">$(a308_ldesc)</p>
    </td>
    </tr>
```

TABLE I-continued

```
      </table>
    </td>
  </tr>
</table>
<!-- content area ends -->
```

The invention claimed is:

1. A method of constructing featured product portions of Web pages, said method comprising the steps of:
   (1) providing a plurality of display templates, each template comprising HTML code defining a scheme for presenting information about a plurality of featured items, said templates including variables as place holders for information content and including a plurality of areas, each for presenting information about one featured item, each of said areas including sub-areas defined for information corresponding to categories in said database;
   (2) providing a database of information about featured items, said database comprising categories corresponding to said variables in said templates; and
   (3) substituting data corresponding to a particular featured item and category for said corresponding variable in said templates to create a featured product portion for a Web page;
   (4) enabling a user to view a visual representation of each of said templates;
   (5) importing said information about featured items into said database from a spreadsheet
   (6) entering said information about said featured items into said spreadsheet;
   (7) when a user requests a Web page, identifying the specific page requested;
   (8) finding in said database all featured items corresponding to said requested page;
   (9) for each featured item in said database corresponding to said requested page, determining the template indicated in said database for displaying said featured item;
   (10) substituting information from said database for corresponding variables in said template to form a populated template;
   (11) inserting said populated template into said requested page;
   (12) delivering said requested page to said user; and
   (13) providing a graphical user interface enabling a user to view said templates;
   wherein said information about the featured item is organized into categories, said categories including at least descriptive text corresponding to said item, a minimum price corresponding to said featured item, a maximum price corresponding to said item, a path to an image corresponding to said featured item, a display template category identifying a particular display template into which the information about the corresponding featured item is to be substituted, an item area category identifying a particular portion of the display template identified in the display template category into which the information about the corresponding featured item is to be inserted, and an address of a page within which said featured item is to be inserted;
   wherein, when said minimum price and said maximum price corresponding to a featured product are the same, said template is populated in step (9) with only one of said minimum and maximum prices; and
   wherein said variables in said templates comprise generic content corresponding to the category to which said variables correspond so that a Web browser can render an example of how said templates will look using said variables prior to being populated with said data from said database.

2. The method of claim 1 wherein step (10) comprises substituting information from said database for a featured item for the corresponding variables in the corresponding item area of the corresponding template.

3. The method of claim 1 wherein said Web pages are part of an electronic commerce Web site that offers products and/or services for sale via said Web site.

4. The method of claim 3 wherein said featured items are products and/or services.

5. A computer program product embodied on a computer readable medium, for constructing featured product portions of Web pages, said product comprising computer executable instructions for:
   (1) providing a plurality of display templates, each template comprising HTML code defining a scheme for presenting information about a plurality of featured items, said templates including variables as place holders for information content, wherein said templates include a plurality of areas, each for presenting information about one featured item, each of said areas including sub-areas defined for information corresponding to categories in said database
   (2) providing a database of information about featured items, said database including categories corresponding to said variables in said templates;
   (3) substituting data corresponding to a particular featured item and category is substituted for said corresponding variable in said templates to create a featured product portion for a Web page;
   (4) enabling a user to view a visual representation of each of said templates;
   (5) importing said information about featured items into said database from a spreadsheet
   (6) when a user requests a Web page, identifying the specific page requested;
   (7) determining the template corresponding to said specific page indicated in said database for displaying featured items;
   (8) finding in said database all featured items corresponding to said requested page;
   (9) substituting information from said database for corresponding variables in said template to form a populated template;
   (10) inserting said populated template into said requested page;
   (11) delivering said requested page to said user; and
   (12) providing a graphical user interface enabling a user to view said templates;

wherein said information about each featured item is organized into categories, said categories including at least descriptive text corresponding to featured item, a minimum price corresponding to said featured item, a maximum price corresponding to said featured item, a path image corresponding to featured item, a display template category identifying a display template into which the information about the corresponding featured item is to be substituted, an item area category identifying a particular portion of the display template identified in the display template category into which the information about the corresponding featured item is to be inserted, and an address of a page within which said featured item is to be inserted;

wherein, when said minimum price and said maximum price corresponding to a featured product are the same, said instruction (9) populates said template with only one of said minimum and maximum prices; and wherein said variables in said templates comprise generic content corresponding to the category to which said variables correspond so that a Web browser can render an example of how said templates will look using said variables prior to being populated with said data from said database.

6. The computer program product of claim 5 further comprising computer executable instructions for:

(14) entering said information about said featured items into said spreadsheet.

7. The computer program product of claim 5 wherein instruction (10) comprises substituting information from said database for a featured item for the corresponding variables in the corresponding item area of the corresponding template.

8. The computer program product of claim 5 wherein said Web pages are part of an electronic commerce Web site that offers products and/or services for sale via said Web site.

9. The computer program product of claim 8 wherein said featured items are products and/or services.

\* \* \* \* \*